Patented May 10, 1932

1,857,296

UNITED STATES PATENT OFFICE

CARL EYER, FRIEDRICH FROWEIN, AND FRIEDRICH KORN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF PRODUCING BALLAST-FREE SOLID FERTILIZERS

No Drawing. Application filed February 28, 1929, Serial No. 343,562, and in Germany March 7, 1928.

The present invention relates to ballast-free solid fertilizers which besides nitrogen, phosphoric acid and potash also contain lime, and which are particularly suitable for acid soils, and to a process for producing such fertilizers.

We have found that a solid fertilizer of the said nature is obtained in a comparatively simple manner by decomposing crude calcium phosphate with nitric acid, precipitating the phosphoric acid in the form of dicalcium phosphate by the addition of suitable calcium compounds, separating the precipitate from the solution, effecting partial conversion of this solution which contains calcium nitrate, with potassium sulphate, thereby producing a solution containing potassium and calcium nitrates, concentrating this solution, and adding a part or the whole of the separated dicalcium phosphate, preferably in a dry state, to the concentrated solution. The mixture of salts so obtained may then be converted by any suitable method, as for example by passing it as a hot mass through a cooled stirring worm, into a solid form in which it is capable of being directly scattered.

The precipitate may be mixed directly with the hot concentrated solution of salts at about 120° centigrade, whereby, as has been found, the citrate solubility of the dicalcium phosphate not only is not decreased, but on the contrary is increased.

In accordance with the present invention solid fertilizers may be obtained, if necessary with the addition of ammonium nitrate, in which N, $P_2O_5$ and $K_2O$ are present in practically any desired proportions.

The following example will further illustrate the nature of the said invention which however is not restricted thereto.

*Example.*—In order to obtain the ratio of N to $P_2O_5$ to $K_2O$ = 1 to 0.75 to 1.75 the process may be carried out as follows:—

1 ton of crude calcium phosphate is decomposed by 2 cubic meters of nitric acid of 50 per cent by volume strength, and the phosphoric acid solution obtained, if desired after the separation of undissolved impurities, treated with 15 per cent milk of lime and the precipitate so obtained separated off. Potassium sulphate in the form of a solution having a temperature of 95° to 100° centigrade is then introduced into the solution remaining after the above treatment and which is also heated to 95° to 100° centigrade. 325 kilograms of 94 per cent potassium sulphate are necessary for the conversion of each cubic meter of a 50 volume per cent calcium nitrate solution. After filtering off the gypsum the filtrate is strongly concentrated in vacuo, after adding 20 kilograms of ammonium nitrate. 195 kilograms of the precipitate of dicalcium phosphate previously separated are then added to the hot solution at 120° centigrade, and the mixture is then solidified by cooling. The salt so obtained is completely homogeneous and is capable of direct scattering. It contains approximately:—

12.0 per cent of nitrogen, 9.0 per cent of phosphoric acid ($P_2O_5$), 21.0 per cent of potash ($K_2O$), and 17.0 per cent of lime (CaO).

What we claim is:—

1. The process of producing a ballast-free solid fertilizer which comprises decomposing crude calcium phosphate with nitric acid, adding a calcium compound to the resulting solution to precipitate dicalcium phosphate, separating the dicalcium phosphate from the solution, partially converting the solution with potassium sulphate, concentrating the resulting solution, adding at least part of the dicalcium phosphate previously separated, and converting the mixture into a dry product.

2. The process of producing a ballast-free solid fertilizer which comprises decomposing crude calcium phosphate with nitric acid, adding lime to the resulting solution to precipitate dicalcium phosphate, separating the dicalcium phosphate from the solution, partially converting the solution with potassium sulphate, filtering off the gypsum, concentrating the resulting solution, adding at least part of the dicalcium phosphate previously separated, and converting the mixture into a dry product.

3. The process of producing a ballast-free solid fertilizer which comprises decomposing crude calcium phosphate with nitric acid, adding lime to the resulting solution to precipitate dicalcium phosphate, separating the dicalcium phosphate from the solution, partially converting the solution with potassium sulphate, filtering off the gypsum, concentrating the resulting solution, adding at least part of the dried dicalcium phosphate previously separated, and converting the mixture into a dry product.

4. The process of producing a ballast-free solid fertilizer which comprises decomposing crude calcium phosphate with nitric acid in the proportion of 1 metric ton to 2 cubic meters of acid of 50 per cent strength, adding lime to the resulting solution to precipitate dicalcium phosphate, separating the dicalcium phosphate from the solution, partially converting the solution with potassium sulphate in the proportion of 325 kilograms of 94 per cent potassium sulphate per cubic meter of the solution of 50 per cent strength, adding ammonium nitrate, concentrating the resulting solution, adding at least part of the dry dicalcium phosphate previously separated, and converting the mixture into a dry product.

In testimony whereof we have hereunto set our hands.

CARL EYER.
FRIEDRICH FROWEIN.
FRIEDRICH KORN.